(12) United States Patent
Huang (10) Patent No.: US 11,934,587 B1
(45) Date of Patent: Mar. 19, 2024

(54) ADJUSTABLE KEYBOARD PALM REST

(71) Applicant: Cheng Yu Huang, New Taipei (TW)

(72) Inventor: Cheng Yu Huang, New Taipei (TW)

(*) Notice: Subject to any disclaimer, the term of this patent is extended or adjusted under 35 U.S.C. 154(b) by 0 days.

(21) Appl. No.: 18/203,104

(22) Filed: May 30, 2023

(51) Int. Cl.
G06F 3/02 (2006.01)
A47B 21/03 (2006.01)
A47C 16/00 (2006.01)

(52) U.S. Cl.
CPC ...... G06F 3/021 (2013.01); *A47B 2021/0307* (2013.01); *A47B 2021/035* (2013.01); *A47B 21/0371* (2013.01); *A47B 2021/0392* (2013.01); *A47B 2200/0088* (2013.01); *A47B 2200/0091* (2013.01); *A47B 2200/0092* (2013.01); *A47C 16/00* (2013.01); *F16M 2200/022* (2013.01); *F16M 2200/027* (2013.01)

(58) Field of Classification Search
CPC ............... G06F 3/021; A47B 21/0371; A47B 2021/035; A47B 2021/0392; A47B 2200/0091; A47B 2200/0092; A47B 2021/0307; A47B 2200/0088; A47C 16/00; F16M 2200/022; F16M 2200/027
See application file for complete search history.

(56) References Cited

U.S. PATENT DOCUMENTS 6,059,366 A * 5/2000 Hu .......................... B60N 2/75
297/411.31
6,247,672 B1 * 6/2001 Bello ..................... A47C 16/00
248/118.1

* cited by examiner

Primary Examiner — Douglas M Wilson
(74) Attorney, Agent, or Firm — Jackson IPG PLLC; Demian K. Jackson (57) ABSTRACT

A keyboard palm rest includes a base including a raised intermediate member, first and second cavities extending from two sides of the intermediate member respectively, and first and second grooves disposed through the first and second cavities respectively; a first pad including a first projection slidably disposed in the first groove; a second pad including a second projection slidably disposed in the second groove; a first sliding member including a first resilient member moveably disposed in the first cavity, and a first fastener driven through the first resilient member into the first projection to pivotably secure the first pad to the first sliding member; and a second sliding member includes a second resilient member moveably disposed in the second cavity, and a second fastener driven through the second resilient member into the second projection to pivotably secure the second pad to the second sliding member.

1 Claim, 14 Drawing Sheets

ADJUSTABLE KEYBOARD PALM REST

BACKGROUND OF THE INVENTION

1. Field of the Invention

The invention relates to palm rests for computer keyboard and more particularly to a keyboard palm rest including slidable and pivotal left and right pads for length adjustment and/or angle adjustment.

2. Description of Related Art

In today's information age, except for babies, everyone is inseparable from computers. Personal computers and notebook computers are the most popular information media. Currently, the most direct way to transmit information between a computer user and a computer is through keyboard input or the operation of a mouse. Thus, personal computers, notebook computers, and tablet computers are all equipped with a keyboard or mouse. However, using the keyboard or mouse for a long time may cause discomfort to the wrist or elbow, and even cause work injury.

Figure 17:
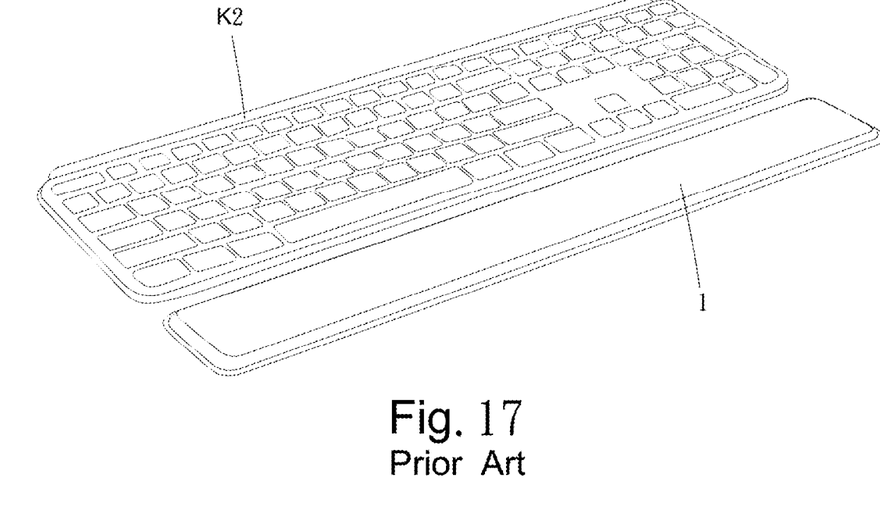
FIG. 17 is a perspective view of a conventional palm rest placed in front of a large computer keyboard.
Figure 18:
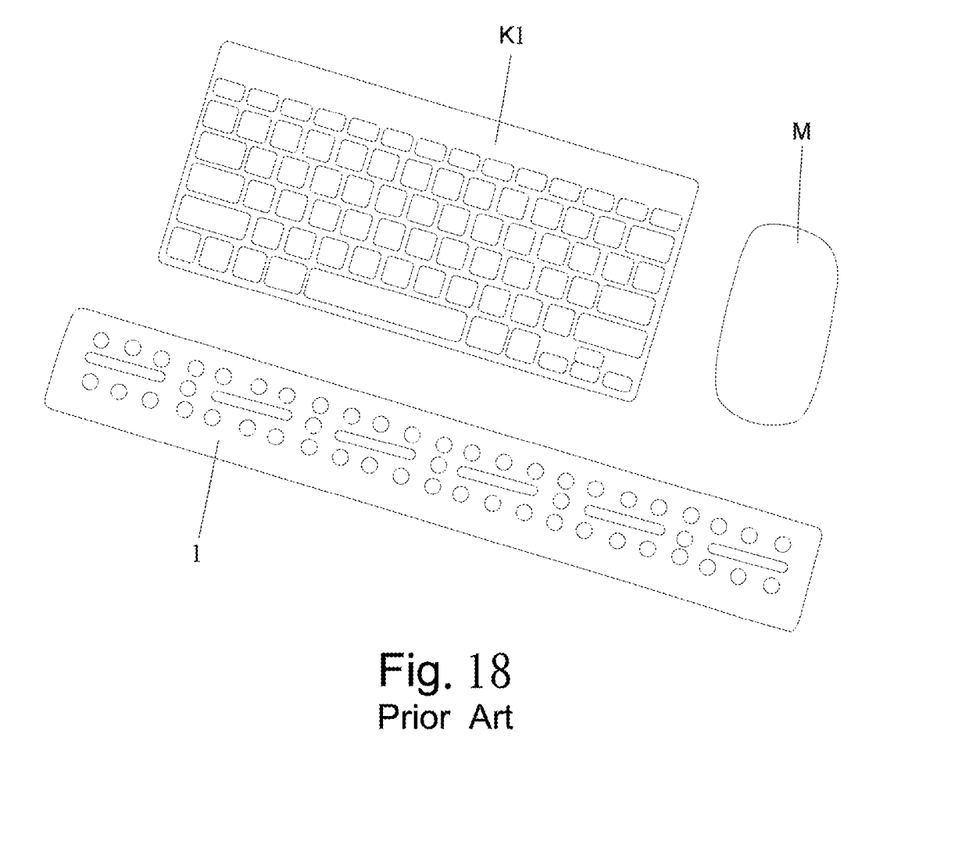
FIG. 18 is a perspective view of another conventional palm rest placed in front of a mouse and a small computer keyboard without a keypad.
Figure 19:
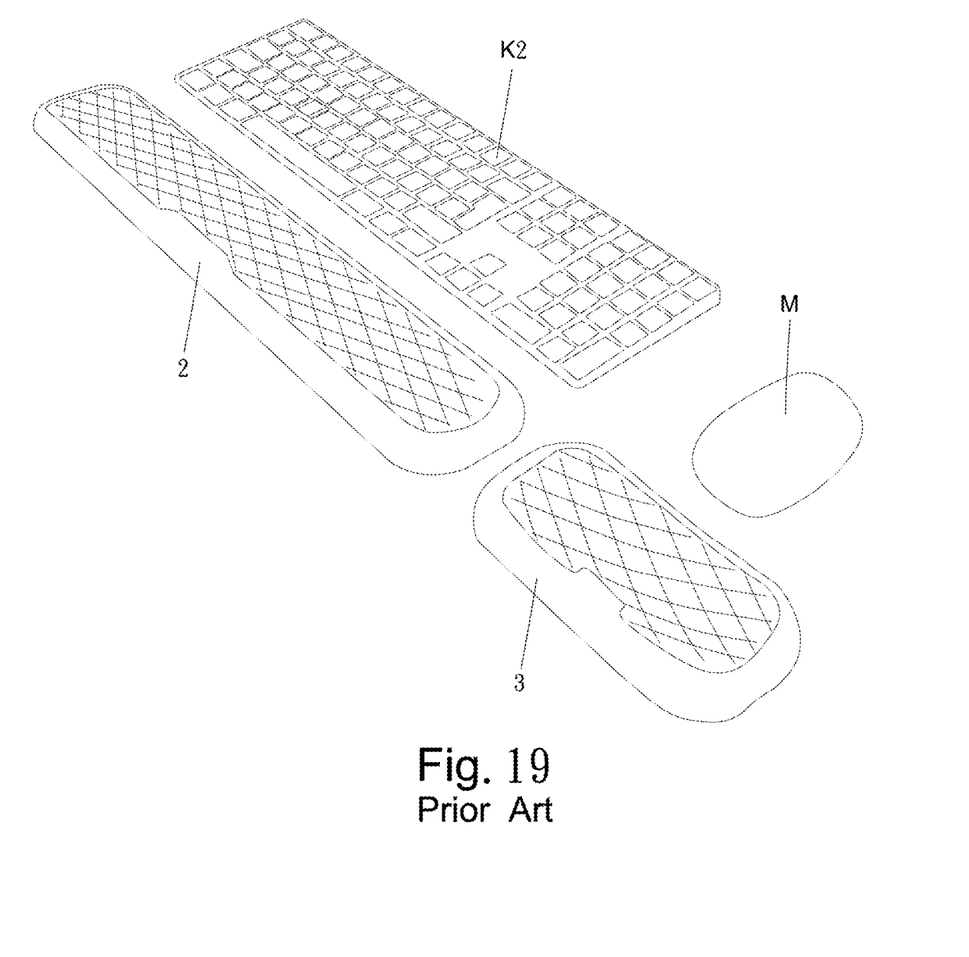
FIG. 19 is a perspective view of still another conventional palm rest placed in front of a large computer keyboard and a mouse, the conventional palm rest consisting of two separate parts.

There are a number of conventional palm rests commercially available for protecting the wrist and/or elbow when using a computer keyboard. As shown in FIG. 17, it is a conventional palm rest 1 for use with a large computer keyboard K2. As shown in FIG. 18, it is another conventional palm rest 1 for use with a mouse M and a small computer keyboard K1 without a keypad. As shown in FIG. 19, it is still another conventional palm rest 1 having a first part 2 for use with a large computer keyboard K2, and a separate part 3 for use with a mouse M.

However, the conventional palm rests have the following drawbacks including length being not adjustable and padding being not pivotal for accommodating different users and applications.

Thus, the need for improvement still exists.

SUMMARY OF THE INVENTION

It is an object of the invention to provide a keyboard palm rest comprising a base including a raised intermediate member, a first cavity lengthwise extending from a first side of the raised intermediate member, a second cavity lengthwise extending from a second side of the raised intermediate member, a first lengthwise groove disposed through the first cavity, and a second lengthwise groove disposed through the second cavity, the second lengthwise groove being aligned with the first lengthwise groove; first and second pads separated by the raised intermediate member wherein the first pad includes a first bottom projection slidably disposed in the first lengthwise groove and the second pad includes a second bottom projection slidably disposed in the second lengthwise groove; a first sliding member including a first sleeve, a first resilient member moveably disposed in the first cavity, and a first fastener driven through the first sleeve and the first resilient member into the first bottom projection to pivotably secure the first pad o the first sliding member; and a second sliding member includes a first sleeve, a second resilient member moveably disposed in the second cavity, and a second fastener driven through the second sleeve and the second resilient member into the second bottom projection to pivotably secure the second pad to the second sliding member.

The above and other objects, features and advantages of the invention will become apparent from the following detailed description taken with the accompanying drawings.

DETAILED DESCRIPTION OF THE INVENTION

Referring to FIGS. 1 to 16, an adjustable keyboard palm rest in accordance with the invention comprises a base 4;

first and second pads 5, 6; and first and second sliding members 7, 8 as discussed in detail below.

The base 4 includes a raised intermediate member 41; a first cavity 42 lengthwise extending from a first side of the raised intermediate member 41; a second cavity 43 lengthwise extending from a second side of the raised intermediate member 41; a first lengthwise groove 421 disposed through the first cavity 42; and a second lengthwise groove 431 disposed through the second cavity 43, the second lengthwise groove 431 being aligned with the first lengthwise groove 421.

The first and second pads 5, 6 are separated by the raised intermediate member 41. The first pad 5 includes a first bottom projection 51 slidably disposed in the first lengthwise groove 421. The second pad 6 includes a second bottom projection 61 slidably disposed in the second lengthwise groove 431.

The first sliding member 7 includes a first resilient member 72 moveably disposed in the first cavity 42, and a first screw 73 driven through a first sleeve 71 and the first resilient member 72 into the first bottom projection 51 to pivotably secure the first pad 5 to the first sliding member 7. The second sliding member 8 includes a second resilient member 82 moveably disposed in the second cavity 43, and a second screw 83 driven through a second sleeve 81 and the second resilient member 82 into the second bottom projection 61 to pivotably secure the second pad 6 to the second sliding member 8.

Operations of the invention are detailed below.

Figure 1:
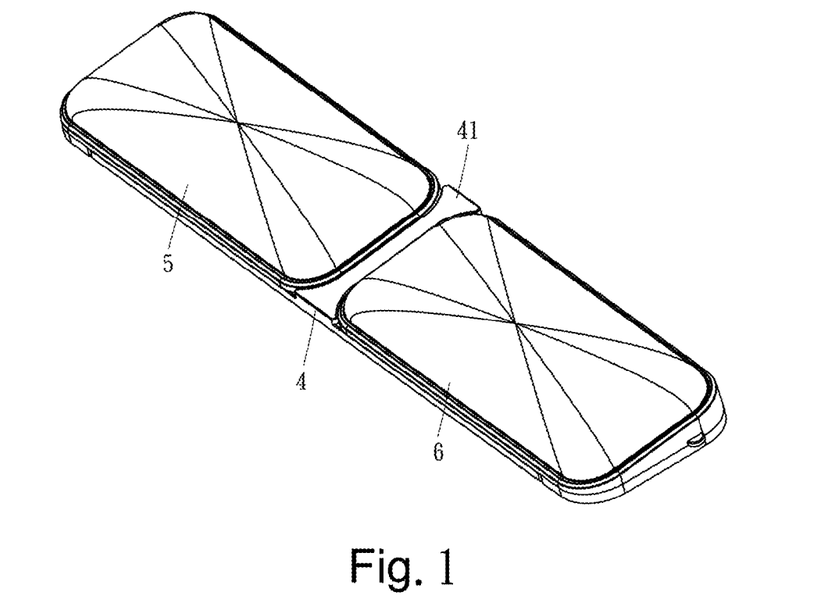
FIG. 1 is a perspective view of an adjustable keyboard palm rest according to a preferred embodiment of the invention.
Figure 2:
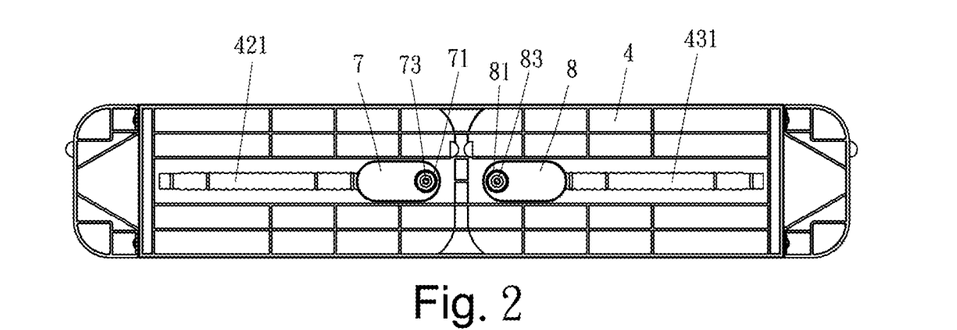
FIG. 2 is a bottom plan view of the adjustable keyboard palm rest.
Figure 3:
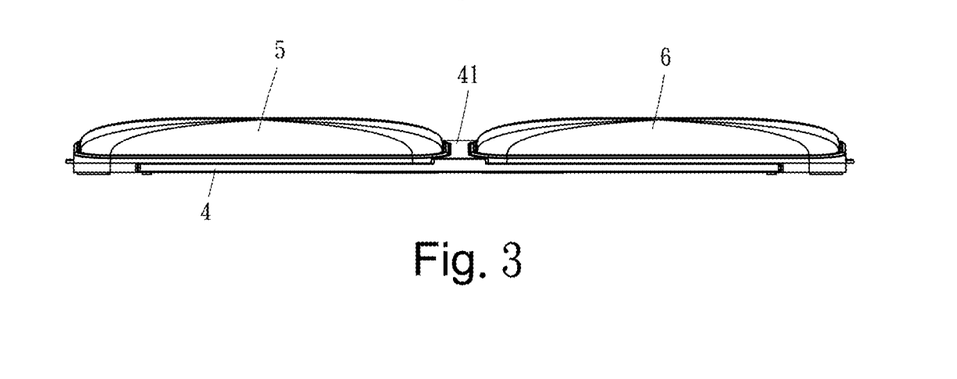
FIG. 3 is a front view of the adjustable keyboard palm rest.
Figure 4:
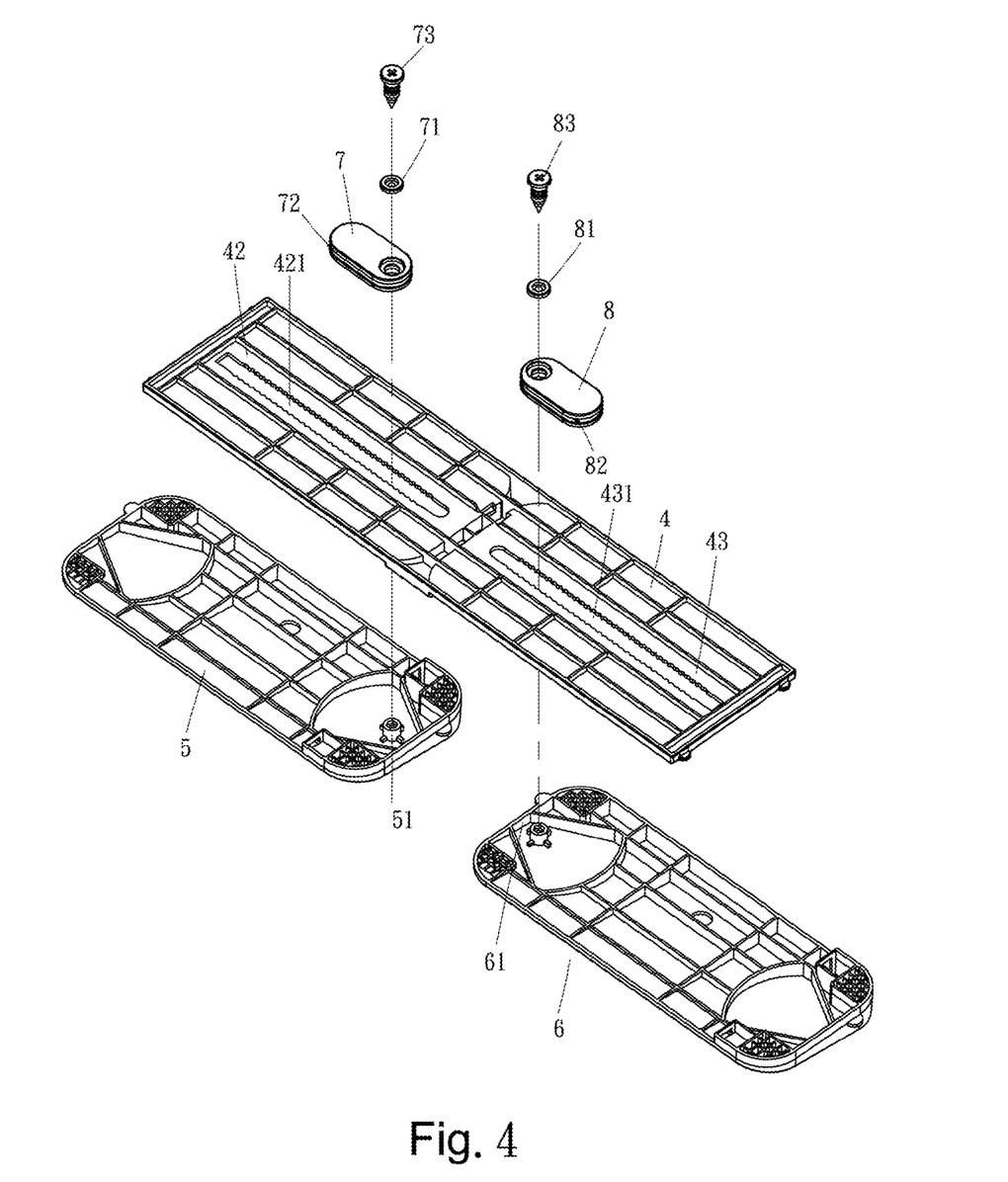
FIG. 4 is an exploded view of the adjustable keyboard palm rest.
Figure 5:
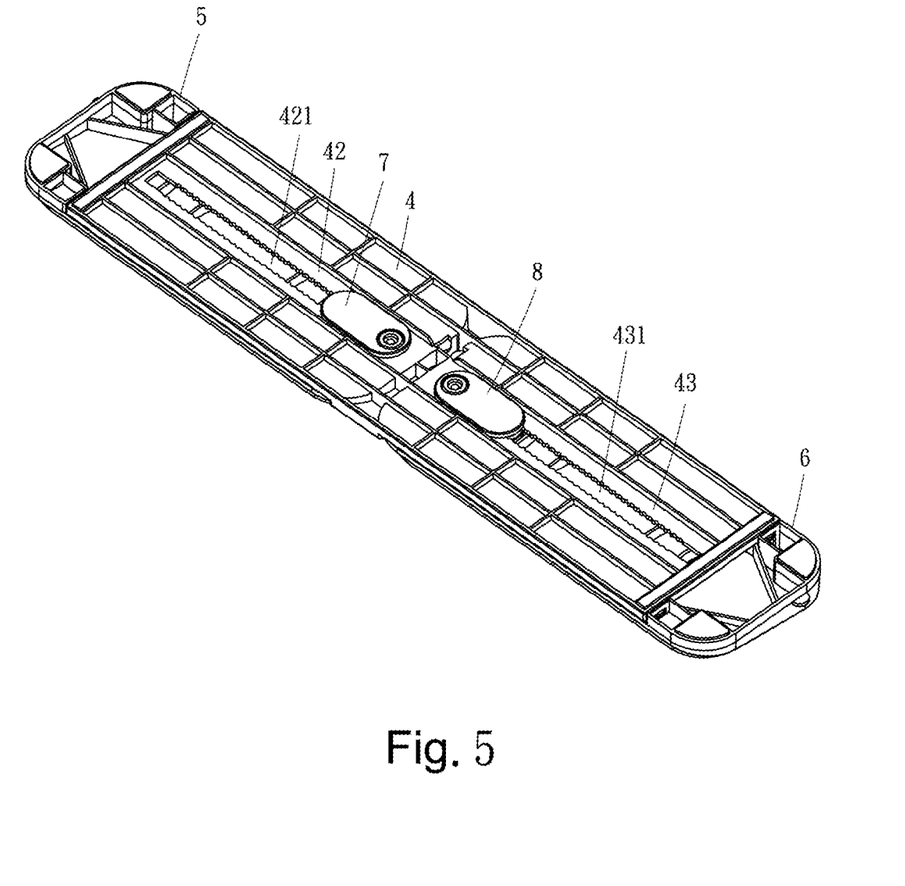
FIG. 5 is another perspective view of the adjustable keyboard palm rest, viewed from bottom.
Figure 6:
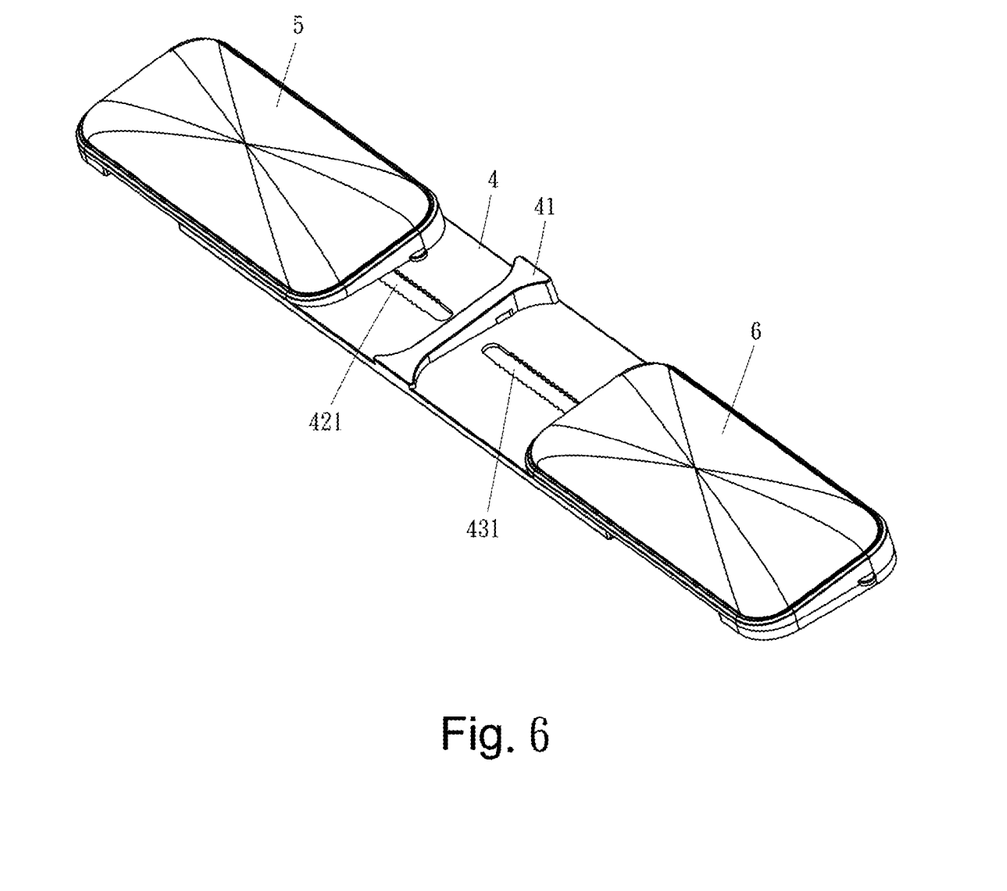
FIG. 6 is a perspective view of the adjustable keyboard palm rest, the first and second pads being slid to left side and right side respectively.

As shown in FIG. 6 specifically, the first and second pads 5, 6 are slid to left side and right side respectively.

Figure 7:
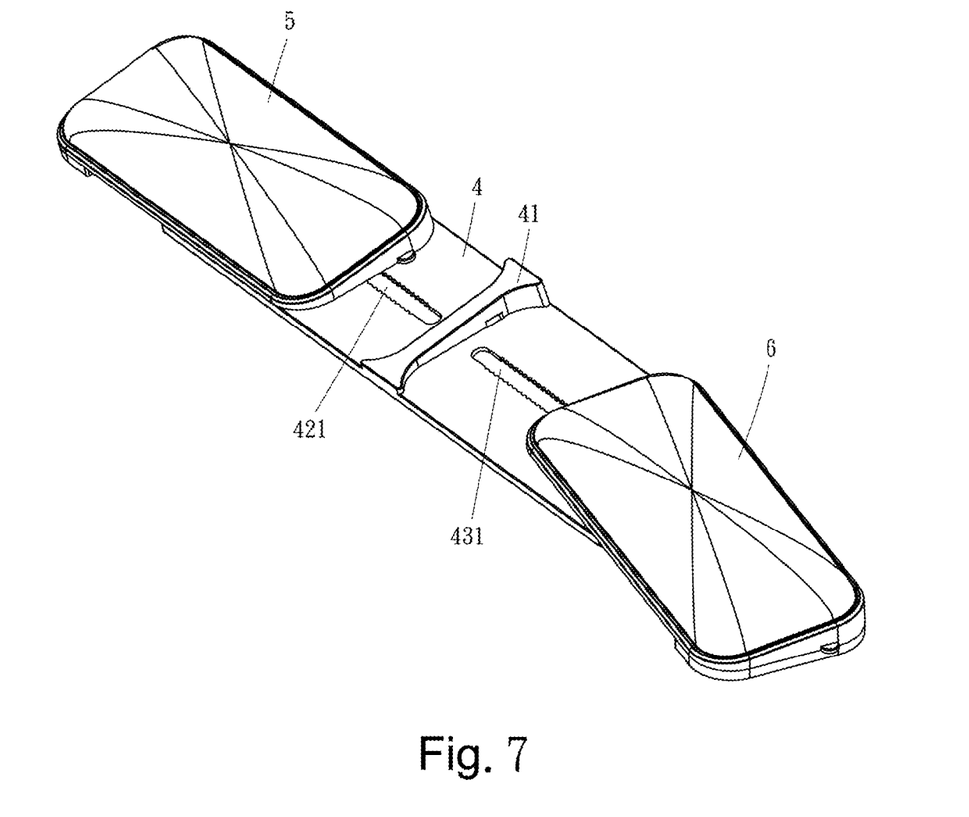
FIG. 7 is a perspective view of the adjustable keyboard palm rest, the second pad being further pivoted clockwise.

As shown in FIG. 7 specifically, the second pad 6 is further pivoted clockwise.

Figure 8:
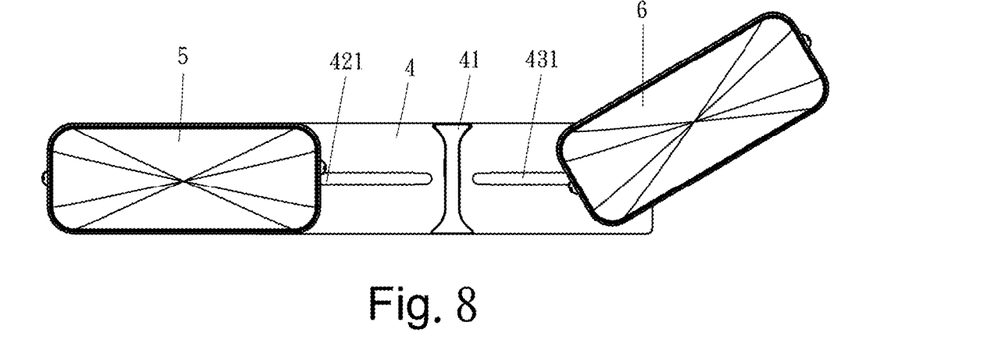
FIG. 8 is a perspective view of the adjustable keyboard palm rest, the second pad being further pivoted counter-clockwise.

As shown in FIG. 8 specifically, the second pad 6 is further pivoted counterclockwise.

Figure 9:
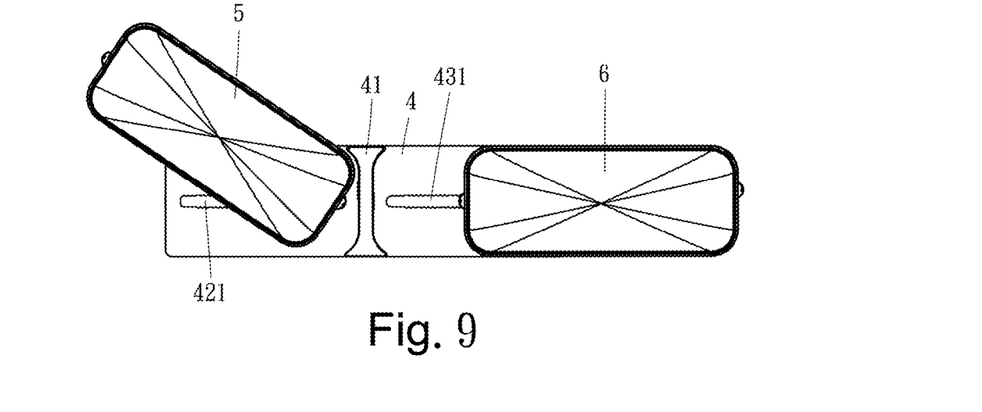
FIG. 9 is a perspective view of the adjustable keyboard palm rest, the first pad being further pivoted clockwise.

As shown in FIG. 9 specifically, the first pad 5 is further pivoted clockwise.

Figure 10:
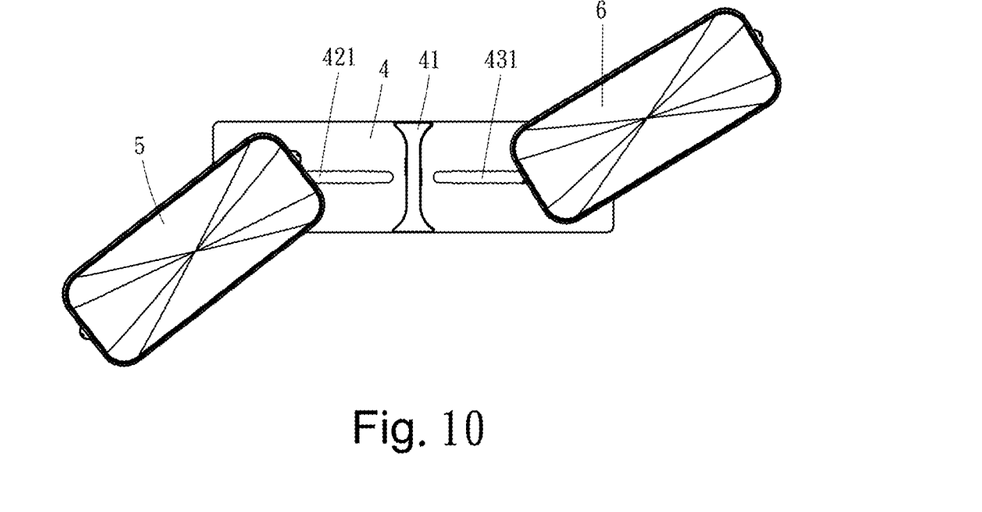
FIG. 10 is a perspective view of the adjustable keyboard palm rest, both the first and second pads being further pivoted counterclockwise.

As shown in FIG. 10 specifically, both the first and second pads 5, 6 are further pivoted counterclockwise.

Figure 11:
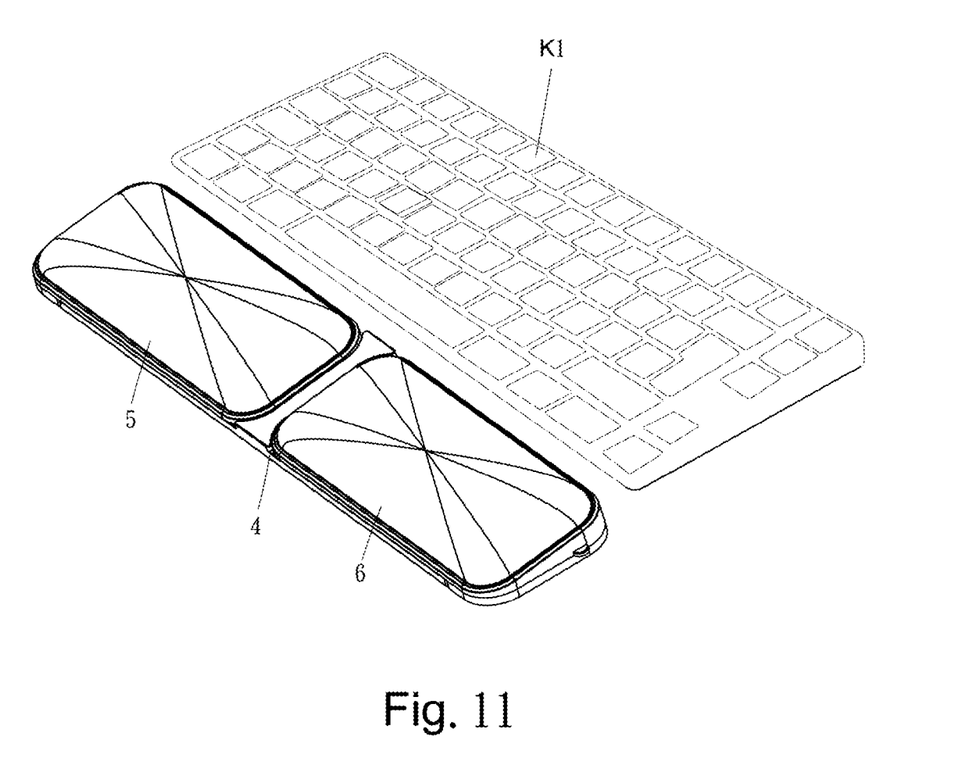
FIG. 11 is a perspective view of the adjustable keyboard palm rest, the adjustable keyboard palm rest being placed in front of a small computer keyboard.

As shown in FIG. 11 specifically, the adjustable keyboard palm rest is placed in front of a small computer keyboard K1.

Figure 12:
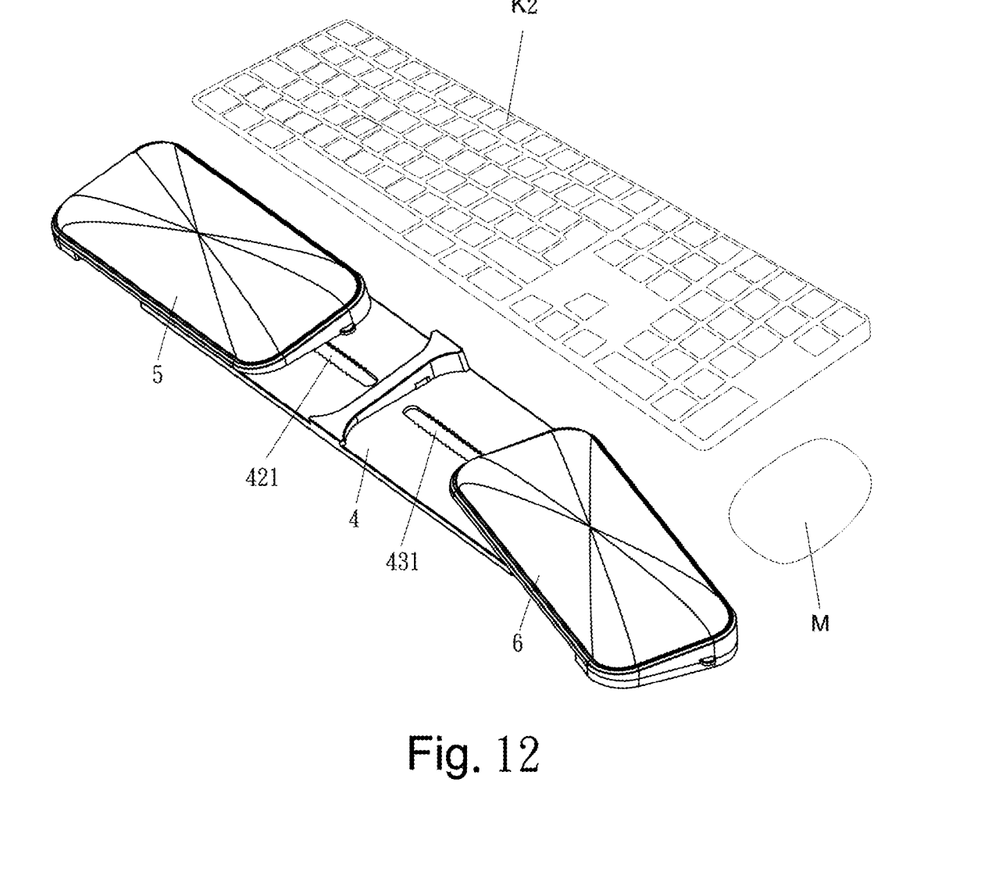
FIG. 12 is a perspective view of the adjustable keyboard palm rest, the adjustable keyboard palm rest being placed in front of both the large computer keyboard and a mouse, and the second pad being further pivoted clockwise.

As shown in FIG. 12 specifically, the adjustable keyboard palm rest is placed in front of both a large computer keyboard K2 and a mouse M, and the second pad 6 is further pivoted clockwise.

Figure 13:
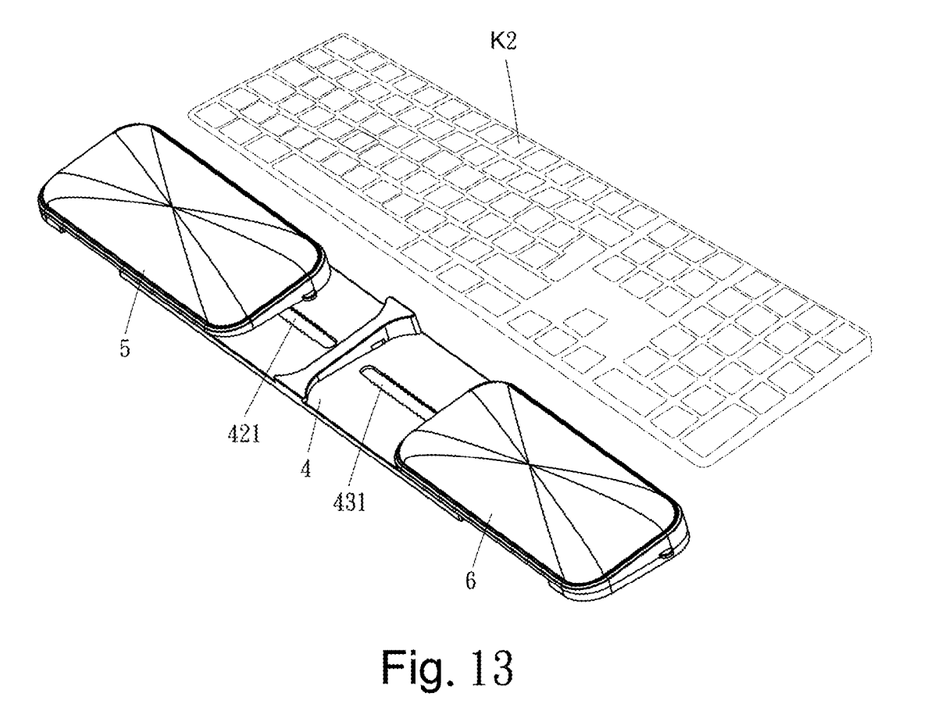
FIG. 13 is a perspective view of the adjustable keyboard palm rest, the adjustable keyboard palm rest being placed in front of a large computer keyboard; and the first and second pads being slid to left side and right side respectively.

As shown in FIG. 13 specifically, the adjustable keyboard palm rest is placed in front of a large computer keyboard K2; and the first and second pads 5, 6 are slid to left side and right side respectively.

Figure 14:
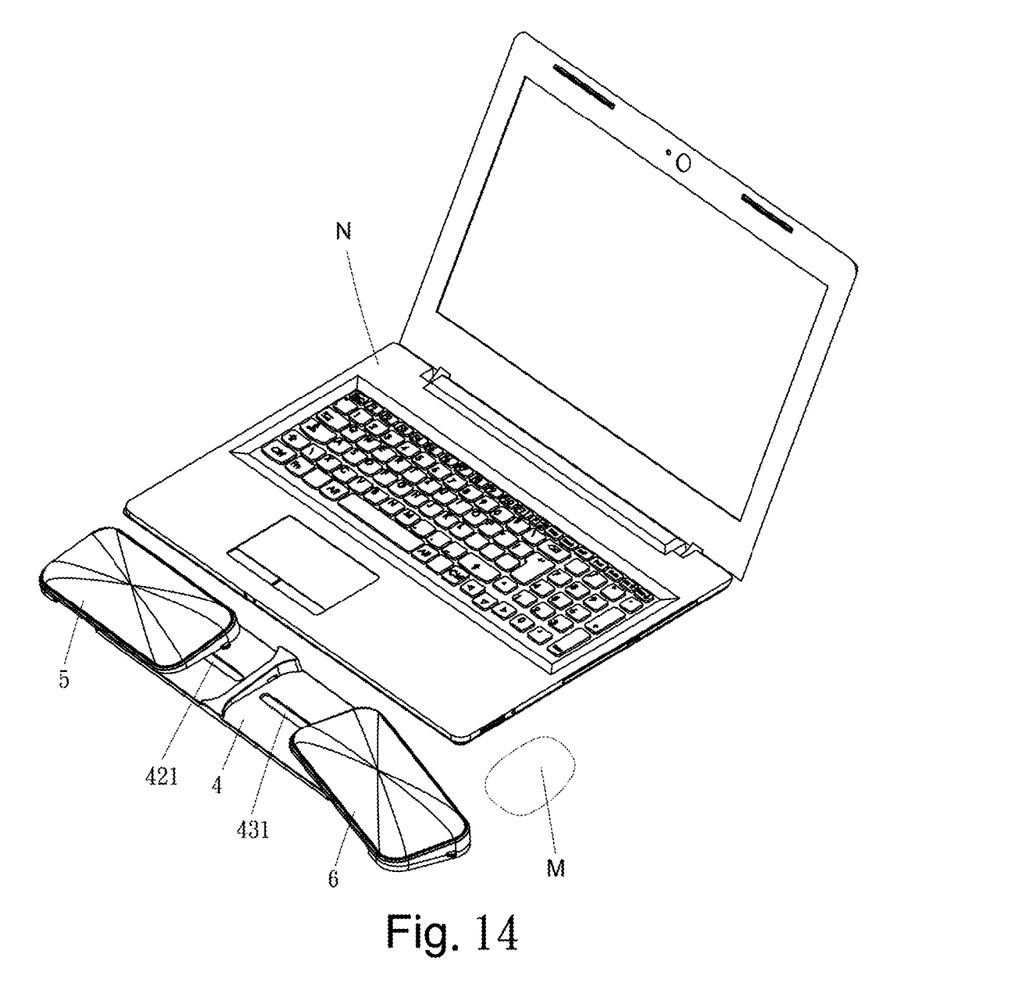
FIG. 14 is a perspective view of the adjustable keyboard palm rest, the adjustable keyboard palm rest being placed in front of both a notebook computer and the mouse; the first and second pads being slid to left side and right side respectively; and the second pad being further pivoted clockwise.

As shown in FIG. 14 specifically, the adjustable keyboard palm rest is placed in front of both a notebook computer N and the mouse M; the first and second pads 5, 6 are slid to left side and right side respectively; and the second pad 6 is further pivoted clockwise.

Figure 15:
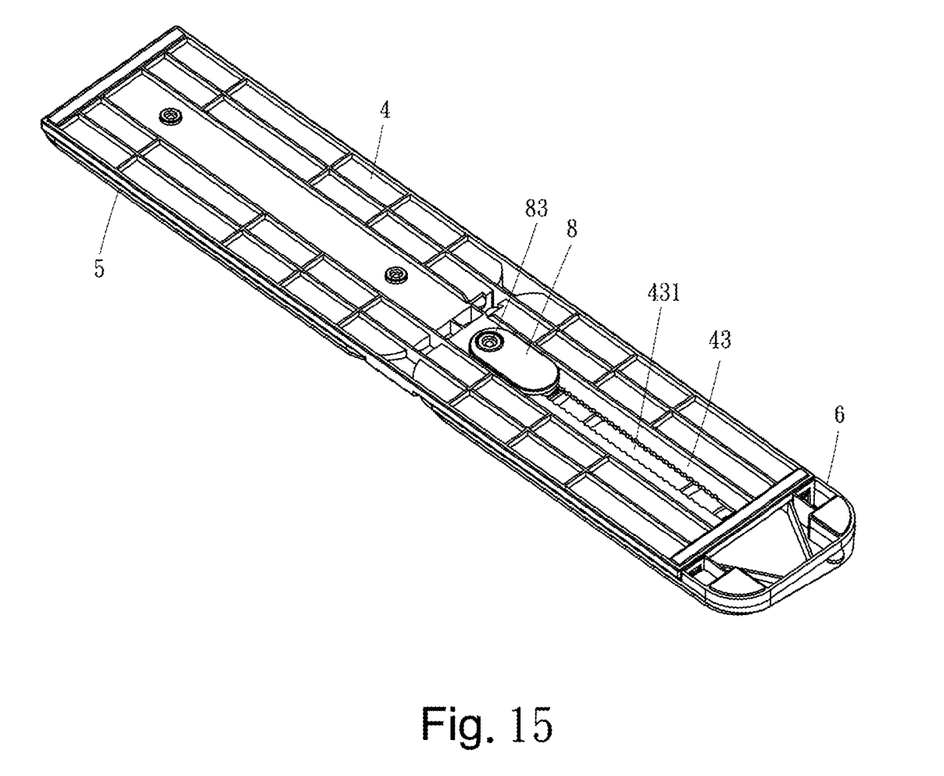
FIG. 15 is a perspective view of an adjustable keyboard palm rest according to an alternative embodiment of the invention, viewed from bottom.
Figure 16:
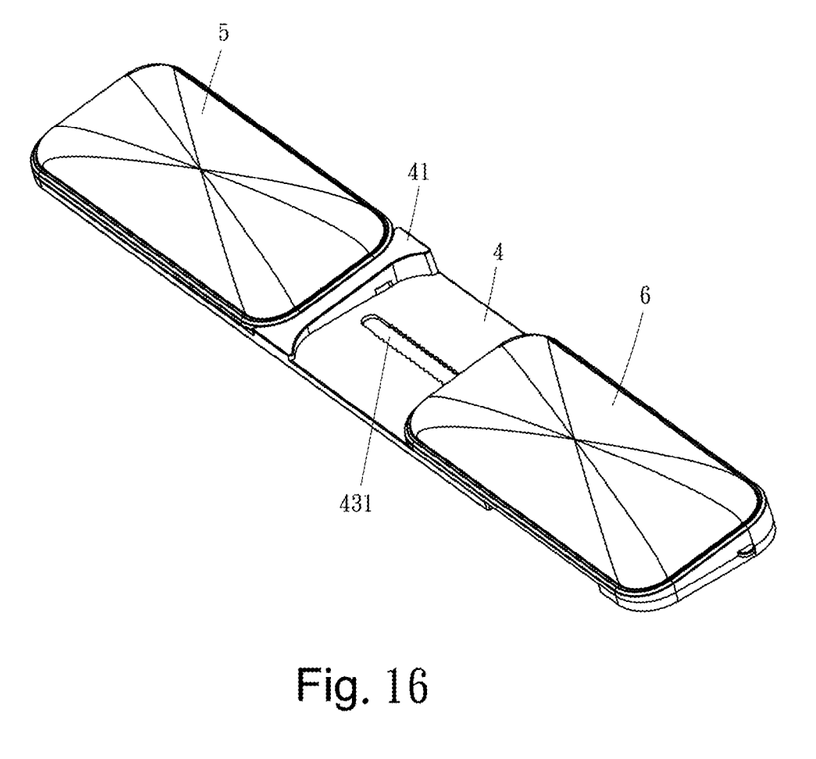
FIG. 16 is a perspective view of the adjustable large keyboard palm rest in FIG. 15, viewed from top.

As shown in FIGS. 15 and 16 specifically, in an alternative embodiment the first pad 5 is fixed and the second pad 6 is slidable and pivotal.

While the invention has been described in terms of preferred embodiments, those skilled in the art will recognize that the invention can be practiced with modifications within the spirit and scope of the appended claims.

What is claimed is:

1. A keyboard palm rest, comprising:
   a base including a raised intermediate member,
   a first cavity lengthwise extending from a first side of the raised intermediate member,
   a second cavity lengthwise extending from a second side of the raised intermediate member,
   a first lengthwise groove disposed through the first cavity, and
   a second lengthwise groove disposed through the second cavity,
   the second lengthwise groove being aligned with the first lengthwise groove;
   first and second pads separated by the raised intermediate member wherein
   the first pad includes a first bottom projection slidably disposed in the first lengthwise groove and
   the second pad includes a second bottom projection slidably disposed in the second lengthwise groove;
   a first sliding member including a first sleeve, a first resilient member moveably disposed in the first cavity, and a first fastener driven through the first sleeve and the first resilient member into the first bottom projection to pivotably secure the first pad to the first sliding member; and
   a second sliding member includes a second sleeve, a second resilient member moveably disposed in the second cavity, and a second fastener driven through the second sleeve and the second resilient member into the second bottom projection to pivotably secure the second pad to the second sliding member.

\* \* \* \* \*